(12) United States Patent
Dubois

(10) Patent No.: US 11,428,321 B2
(45) Date of Patent: Aug. 30, 2022

(54) SEALS

(71) Applicant: SAINT-GOBAIN PERFORMANCE PLASTICS CORPORATION, Solon, OH (US)

(72) Inventor: Herman M. Dubois, Duffel (BE)

(73) Assignee: SAINT-GOBAIN PERFORMANCE PLASTICS CORPORATION, Solon, OH (US)

(*) Notice: Subject to any disclaimer, the term of this patent is extended or adjusted under 35 U.S.C. 154(b) by 426 days.

(21) Appl. No.: 15/142,719

(22) Filed: Apr. 29, 2016

(65) Prior Publication Data

US 2016/0319936 A1 Nov. 3, 2016

Related U.S. Application Data

(60) Provisional application No. 62/155,721, filed on May 1, 2015.

(51) Int. Cl.
*F16J 15/32* (2016.01)
*F16J 15/3236* (2016.01)
*F16J 15/3212* (2016.01)

(52) U.S. Cl.
CPC ........... *F16J 15/32* (2013.01); *F16J 15/3212* (2013.01); *F16J 15/3236* (2013.01)

(58) Field of Classification Search
CPC ...... F16J 15/3212; F16J 15/3208; F16J 15/32; F16J 15/3236
See application file for complete search history.

(56) References Cited

U.S. PATENT DOCUMENTS

| 983,201 | A | | 1/1911 | Brussard |
| 2,088,703 | A | * | 8/1937 | Hubbard ................. F16C 33/74 277/555 |
| 2,350,697 | A | | 6/1944 | Petch |
| 2,841,429 | A | | 7/1958 | McCuistion |
| 3,223,426 | A | * | 12/1965 | Reid ...................... F16J 15/121 277/647 |
| 3,563,557 | A | | 2/1971 | Doutt |
| 3,612,551 | A | | 10/1971 | Grabill, Jr. |
| 3,642,248 | A | * | 2/1972 | Benware .................. F16K 3/12 251/172 |
| 3,687,464 | A | | 8/1972 | Jackson et al. |
| 3,820,799 | A | * | 6/1974 | Abbes et al. ........ F16J 15/0893 277/647 |
| 4,074,908 | A | | 2/1978 | Spencer |

(Continued)

FOREIGN PATENT DOCUMENTS

| EP | 2287499 B1 | 10/2013 |
| WO | 2014140379 A1 | 9/2014 |
| WO | 2016179008 A1 | 11/2016 |

OTHER PUBLICATIONS

International Search Report for PCT/US2016/030145), dated Aug. 24, 2016, 1 page.

*Primary Examiner* — Christine M Mills
*Assistant Examiner* — L. Susmitha Koneru
(74) *Attorney, Agent, or Firm* — Abel Schillinger, LLP; David G Miranda

(57) ABSTRACT

A seal comprising an annular jacket comprising a body defining an annular recess; a helical spring disposed within the annular recess; and a support member disposed within the helical spring to provide a biasing force against the helical spring in the operational state.

18 Claims, 3 Drawing Sheets

(56) References Cited

U.S. PATENT DOCUMENTS

| | | | |
|---|---|---|---|
| 4,103,909 A * | 8/1978 | Hoffman | F16J 15/3236 251/214 |
| 4,379,558 A * | 4/1983 | Pippert | E21B 33/1216 277/536 |
| 4,509,763 A * | 4/1985 | Fischer | E21B 33/1208 267/1.5 |
| 4,592,558 A | 6/1986 | Hopkins | |
| 4,706,970 A | 11/1987 | Ramirez | |
| 4,907,788 A * | 3/1990 | Balsells | F16F 1/04 267/1.5 |
| 4,934,666 A * | 6/1990 | Balsells | F16F 1/045 267/1.5 |
| 5,265,890 A * | 11/1993 | Balsells | F16F 3/12 277/467 |
| 5,433,456 A | 7/1995 | Nicholson | |
| 5,720,503 A * | 2/1998 | Drijver | E21B 19/004 285/111 |
| 5,799,953 A * | 9/1998 | Henderson | F16J 15/3236 277/554 |
| 5,984,316 A * | 11/1999 | Balsells | F16J 15/3212 277/553 |
| 6,161,838 A * | 12/2000 | Balsells | F16J 15/3216 277/511 |
| 6,419,236 B1 * | 7/2002 | Janian | F16J 15/3212 277/553 |
| 7,055,812 B2 * | 6/2006 | Balsells | F16F 1/045 267/166 |
| 7,111,821 B2 * | 9/2006 | Promper | F16J 15/004 251/214 |
| 7,159,857 B2 * | 1/2007 | Janian | F16F 1/025 267/158 |
| 7,959,159 B2 * | 6/2011 | Hocker | F02M 59/442 277/559 |
| 8,215,646 B2 * | 7/2012 | Castleman | F16J 15/166 277/552 |
| 8,328,202 B2 | 12/2012 | Foster et al. | |
| 8,603,411 B2 * | 12/2013 | Racicot | F16J 15/3268 422/500 |
| 8,622,142 B2 * | 1/2014 | Shaw | E21B 33/04 166/379 |
| 8,714,560 B2 | 5/2014 | Faas | |
| 9,357,684 B2 * | 5/2016 | Foster | F16J 15/3212 |
| 9,556,905 B2 * | 1/2017 | Gibson, Jr. | F16C 33/20 |
| 9,803,752 B2 * | 10/2017 | Castleman | F16J 15/3212 |
| 2006/0202428 A1 * | 9/2006 | Verwoerd | F16J 15/162 277/434 |
| 2010/0052267 A1 * | 3/2010 | Castleman | F16J 15/3236 277/551 |
| 2010/0206575 A1 | 8/2010 | Theiss et al. | |
| 2011/0006486 A1 | 1/2011 | Niknezhad | |
| 2011/0079962 A1 * | 4/2011 | Munro | F16J 15/3236 277/500 |
| 2012/0319025 A1 | 12/2012 | Shu | |
| 2013/0180733 A1 * | 7/2013 | Bradshaw | F16J 15/166 166/387 |
| 2014/0131953 A1 * | 5/2014 | Lehr | E21B 17/1014 277/323 |
| 2015/0083481 A1 * | 3/2015 | Foster | H05K 9/0015 174/350 |
| 2019/0107166 A1 * | 4/2019 | Whitford | F16F 3/04 |

\* cited by examiner

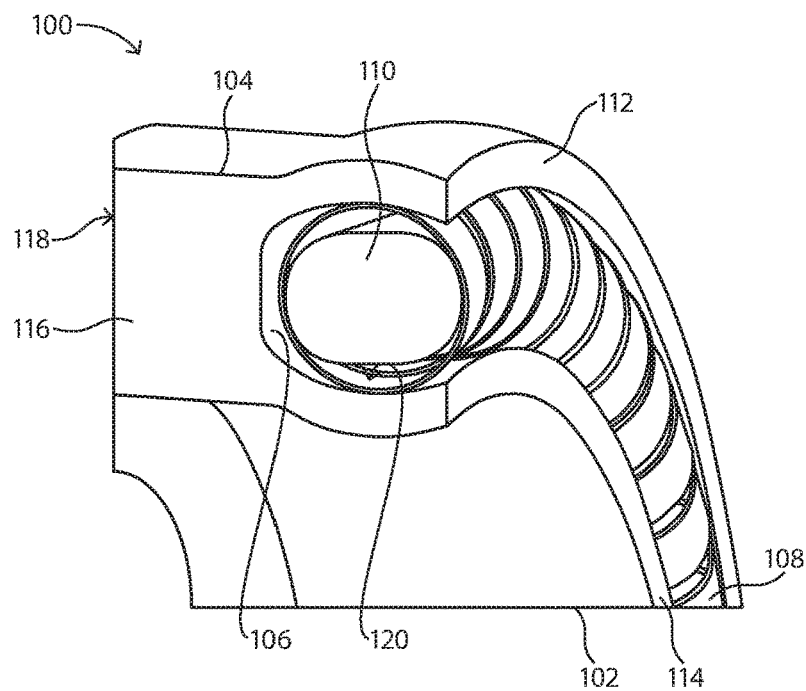
FIG. 1
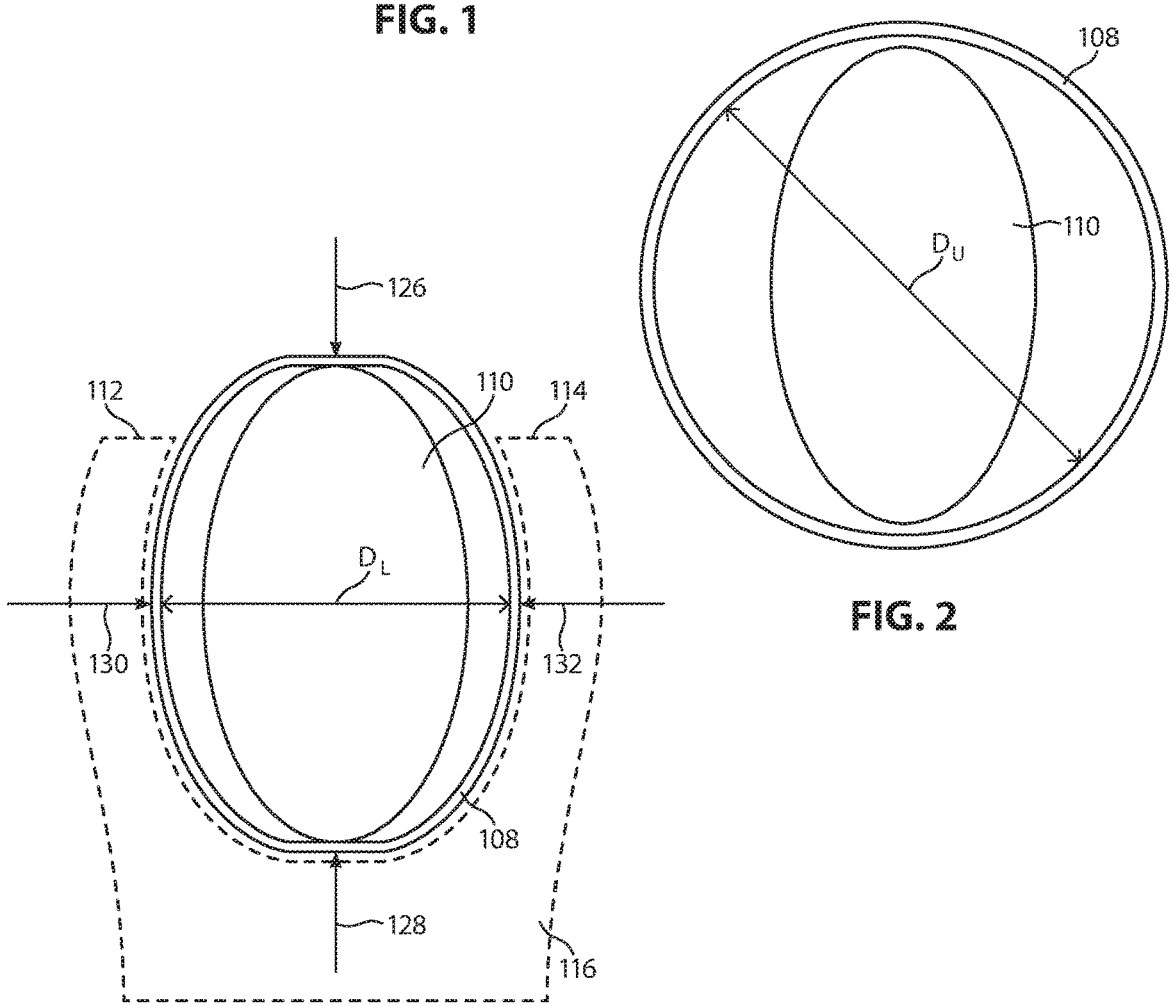
FIG. 2
FIG. 3

SEALS

CROSS-REFERENCE TO RELATED APPLICATION(S)

This application claims priority under 35 U.S.C. § 119(e) to U.S. Patent Application No. 62/155,721 entitled "SEALS," by Herman M. Dubois, filed May 1, 2015, which is assigned to the current assignee hereof and incorporated herein by reference in its entirety.

FIELD OF THE DISCLOSURE

The present disclosure relates to seals, and more particularly to bidirectional seals, or seals adapted to be disposed to back pressure and back loading conditions.

RELATED ART

Seals are employed in environments to segregate fluids (liquids, gases, slurries, etc.) from one another. Under high pressure conditions, particularly back (reverse) pressure, the seals can become ineffective—particularly when exposed to low temperature conditions (e.g., cryogenic temperatures) at high operating pressures. The industry continues to demand improved seals capable of withstanding high pressure conditions while maintaining operational effectiveness at low temperature conditions.

BRIEF DESCRIPTION OF THE DRAWINGS

Embodiments are illustrated by way of example and are not intended to be limited in the accompanying figures.

FIG. 1 includes a cross-sectional perspective view of a seal in accordance with an embodiment.

FIG. 2 includes a cross-sectional elevation view of the spring and support member in accordance with an embodiment as viewed in a relaxed state.

FIG. 3 includes a cross-sectional elevation view of the spring and support member in accordance with an embodiment as viewed in an operational state.

Figure 4:
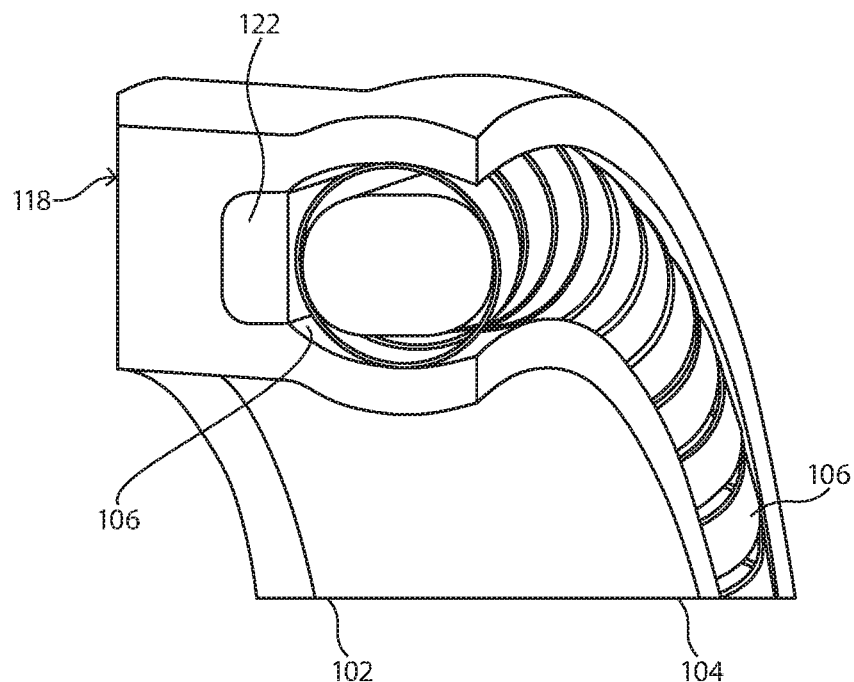
FIG. 4 includes a cross-sectional perspective view of the seal in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the sealing arts.

A seal in accordance with one or more embodiments described herein can generally include an annular jacket, a helical spring, and a support member. The support member can be disposed within the helical spring and nearly or barely contact an inner surface of the helical spring. In turn, the helical spring can be disposed within an annular recess in a body of the jacket. In a particular embodiment, two seals of said seals can be in contact with each other. More particularly, the jackets of the seals can contact each other along back surfaces thereof (i.e., away from the helical spring) in a back-to-back manner.

A valve assembly in accordance with one or more embodiments described herein can generally include a valve body and a shaft disposed inside of and rotatable with respect to the valve. The shaft may further be reciprocally, or longitudinally, translatable with respect to the valve. Two seals can be positioned radially between the shaft and the valve body to seal an annulus therebetween. The seals can each include a jacket, a helical spring, and a support member. The seals may be arranged back-to-back such that the back surfaces of the seals are in contact. In a particular embodiment, the seals may be the same as one another. In another embodiment, the seals may be different from one another. For example, the seals may have different relative sizes, shapes, material compositions, physical properties, or any different combination thereof. While both seals may provide a sealing characteristic, in at least one embodiment one of the seals can provide a sealing characteristic at forward operating pressures while the other of the seals can provide a sealing characteristic at back pressures.

In accordance with one or more embodiments described herein, the seal or seal assembly can provide an effective sealing characteristic at cryogenic temperatures. In a more particular embodiment, the seal or seal assembly can provide effective sealing at temperatures less than −25° C., such as less than −50° C., less than −75° C., or even less than −100° C. An effective sealing characteristic occurs when the seal can effectively mitigate or eliminate leakage to a suitable or desirable threshold. In another embodiment, the seal or seal assembly may provide effective sealing at temperatures of at least 0° C., such as at least 50° C., at least 100° C., at least 150° C., or even at least 200° C.

Seals and seal assemblies in accordance with one or more embodiments described herein may be particularly advantageous for use in bidirectional sealing operations where a back pressure is present. That is, the seals and seal assemblies in those embodiments for use with back pressure, may provide a more effective sealing characteristic when exposed to high back loading and back pressure conditions. As will be described in greater detail below, a support member disposed within a spring of the seal may prevent or mitigate collapse and failure of the spring while permitting sufficient suppleness and spring flexibility to provide an effective sealing characteristic.

Referring initially to FIG. 1, a seal 100 in accordance with embodiments described herein can generally include a jacket 102, a spring 108, and a support member 110. The jacket 102 can include a body 104 defining an annular recess 106. The spring 108 can be disposed within the annular recess 106, providing an outwardly biasing force against lips 112 and 114 of the jacket 102.

In a particular instance, the lips 112 and 114 can extend from a heel 116 of the body 104. In a particular embodiment, the lips 112 and 114 can extend from the heel 116 in a generally same direction relative to one another. In another particular embodiment, the lips 112 and 114 can extend parallel with respect to one another. In an optional embodiment, either or both of the lips 112 and 114 can include a skived lip (not illustrated) adapted to provide a scraper interface for sealing abrasive or viscous material, or environmental components such as dirt, debris, and environmental fluids. In a particular embodiment, the heel 116 can include a flange (not illustrated) which can be secured to a hardware (e.g., a valve body or a shaft) to prevent the seal 100 from turning relative to the hardware.

In an embodiment, at least one of the lips 112 and 114 can include a radial bulge (not illustrated) extending outward from the respective lip 112 or 114 in a direction away from the spring 108. The radial bulge may extend around an entire circumference of the seal 100. Similar to the skived lip described above, the radial bulge may prevent ingress or egress of materials while exhibiting lower frictional drag. In another embodiment, one of the lips 112 or 114 can include a skived lip and the other lip 112 or 114 can include a radial bulge.

As illustrated, the lips 112 and 114 of the jacket 102 can bow outward after installation of the spring 108. After installation of the spring 108, the lips 112 and 114 can be arcuate as viewed in cross section, biased outward by a loading force provided by the spring 108.

In an embodiment, the heel 116 may have approximately the same thickness, as measured in an axial direction of the seal 100, as a thickness of the lips 112 and 114 in a radial direction. In another embodiment, the heel 116 may have an extended thickness. That is, the heel 116 can have a length, as measured from the annular recess 106 to a back surface 118 of the jacket 102, that is at least 20% the diameter of the spring 108, such as at least 30% the diameter of the spring, at least 40% the diameter of the spring, at least 50% the diameter of the spring, at least 60% the diameter of the spring, at least 70% the diameter of the spring, at least 80% the diameter of the spring, at least 90% the diameter of the spring, or even at least 100% the diameter of the spring. In another embodiment, the heel 116 can have a length of no greater than 1000% the diameter of the spring.

In an embodiment, the back surface 118 of the seal 100 can be generally planar. That is, the back surface 118 may lie generally along a plane with minimal surface undulation and deviation. In a more particular embodiment, the back surface 118 of the jacket 102 can be planar. As described in greater detail below, the planar, or generally planar, back surface 118 may facilitate improved contact between adjacent seals thereby providing a better sealing characteristic.

The jacket 100 can be formed from any suitable material recognized by those of ordinary skill in the art. In a particular embodiment, the jacket 100 can at least partially include, or even consist essentially of, a fluoropolymer. Exemplary fluoropolymers include a polytetrafluoroethylene (PTFE), a polyether ether ketone (PEEK), a polyimide (PI), a polyamide-imide (PAI), a fluorinated ethylene propylene (FEP), a polyvinylidene fluoride (PVDF), a perfluoroalkoxy (PFA), a terpolymer of tetrafluoroethylene, a hexafluoropropylene and vinylidene fluoride (THV), a polychlorotrifluoroethylene (PCTFE), an ethylene tetrafluoroethylene copolymer (ETFE), an ethylene chlorotrifluoroethylene copolymer (ECTFE), or any combination thereof. Other fluoropolymers, polymers, and blends may be included in the composition of the jacket 100. In another particular embodiment, the jacket 100 can at least partially include, or even consist essentially of, a polyethylene (PE) such as an ultra-high-molecular-weight polyethylene (UHMWPE).

In an embodiment, the seal 100 can be treated, impregnated, filled, or coated with a lubricious material. Exemplary lubricious materials include molybdenum disulfide, tungsten disulfide, graphite, grapheme, expanded graphite, boron nitrade, talc, calcium fluoride, or any combination thereof. Additionally, the lubricious material can include alumina, silica, titanium dioxide, calcium fluoride, boron nitride, mica, Wollastonite, silicon carbide, silicon nitride, zirconia, carbon black, pigments, or any combination thereof.

In an embodiment, such as illustrated for example in FIG. 4, the jacket 102 may include an insert 122 disposed adjacent to the annular recess 106. The insert 122 may be disposed along an axial end of the annular recess 106. Specifically, the insert 122 may form a surface of the annular recess 106 closest to the back surface 118 of the jacket 102. While the body 104 of the jacket 102 may at least partially include, or even consist essentially of, a first material, the insert 122 may at least partially include, or even consist essentially of, of a second material different than the first material. In this regard, the insert 122 may alter the physical properties of the jacket 102 at a contact point with the spring 108. In a particular instance, the first material may be relatively softer than the second material. Whereas the first material may at least partially include, or even consist essentially of, a UHMWPE or a fluoropolymer such as PTFE, the second material may at least partially include, or even consist essentially of, a material harder than PTFE, such as PEEK.

In certain high pressure applications, as the system pressure increases the spring 108 may partially or fully embed itself in the jacket material, reducing seal effectiveness. The insert 122 may reduce or even prevent such occurrence from happening. In an embodiment, the insert 122 may extend around the entire circumference of the seal 100. In a more particular embodiment, the insert 122 may have a uniform shape and material characteristic around the entire circumference of the seal 100. In another more particular embodiment, the insert 122 may have a varying shape or material selection around the circumference of the seal 100. In another embodiment, the insert 122 may extend around only a portion of the circumference of the seal 100. In a more particular embodiment, the insert 122 may comprise a plurality of inserts 122 at least partially spaced apart from one another. In such embodiment, there may be a circumferential space between adjacent inserts 122.

The spring 108 can be disposed at least partially within the annular recess 106 of the jacket 102. In embodiments having inserts 122, such as described above, the spring 108 may contact the insert 122 in either or both the relaxed or operational states.

In an embodiment, the spring 108 may have a diameter less than 150% the depth of the annular recess 106, such as less than 100% of the depth of the annular recess 106, or even less than 75% of the depth of the annular recess 106. In an embodiment, the diameter of the spring 108 can be no less than 10% of the depth of the annular recess 106.

As contemplated in at least one embodiment described herein, the spring 108 can include a length of material formed into a helical spring having a plurality of coils. In an embodiment, the spring 108 can include at least 2 coils, such as at least 3 coils, at least 4 coils, at least 5 coils, at least 10 coils, at least 100 coils, at least 200 coils, at least 300 coils, at least 400 coils, at least 500 coils, or even at least 1000 coils. The length of material forming the spring 108 can have a polygonal or ellipsoidal cross section. For example, in an embodiment, the spring 108 can be formed from circular wire. In another embodiment, the spring 108 can be formed from a ribbon of material wound into a plurality of coils. The coils of the spring 108 can be adjacent or even partially overlap one another. In a particular instance the coils can be parallel to one another. In another instance, the coils can cant relative to each other. That is, the coils can be angularly offset and angled with respect to one another.

The spring 108 can at least partially include, or even consist essentially of, a metal, such as a steel, or even more particularly spring steel. The metal can be coated or surface treated to prevent corrosion or another undesirable effect from environmental exposure. In another embodiment, the spring 108 can at least partially include, or even consist essentially of, for example, Eligloy, Inconel, Hastelloy, or a combination thereof.

In yet a further embodiment, the spring 108 can include cobalt, chromium, nickel, iron, molybdenum, manganese, or a combination thereof. In a particular embodiment, the spring 108 can include at least 10 wt % of cobalt, such as at least 20 wt % of cobalt, at least 25 wt % of cobalt, at least 30 wt % of cobalt, at least 35 wt % of cobalt, or even at least 40 wt % of cobalt. The spring 108 can have a yield strength of less than 1200 MPa, such as less than 1100 MPa, less than 1000 MPa, or even less than 900 MPa. In a particular instance, the spring 108 may be heat treated or surface treated to enhance properties thereof.

The support member 110 may be disposed within and prevent collapse of the spring 108 upon introduction of high system pressures, such as pressures of at least 400 PSI, at least 500 PSI, at least 600 PSI, at least 700 PSI, at least 800 PSI, at least 900 PSI, at least 1000 PSI, at least 2000 PSI, at least 5000 PSI, or even at least 9500 PSI. Whereas traditional seals may collapse upon introduction of such high pressures thus becoming ineffective, the support member 110 can effectively strengthen the spring 108 at high pressures while permitting sufficient flexibility and sealing characteristics. In a particular instance, the support member 110 may prevent collapse of the spring 108 upon introduction of high system back pressures. The support member 110 may strengthen the spring 108 at high back pressures while permitting sufficient flexibility and sealing characteristic.

The support member 110 may at least partially include, or even consist essentially of, a metal, such as a steel. In another embodiment, the support member 110 may at least partially include, or even consist essentially of, a polymer, such as, for example, a PEEK.

In an embodiment, the support member 110 can have a generally polygonal cross section. For example, the support member 110 may have a generally triangular cross section, a generally quadrilateral cross section, a generally pentagonal cross section, or any cross section including generally straight sidewall segments. In another embodiment, the support member 110 can have a generally ellipsoidal cross section. In yet a further embodiment, the support member 110 may have a partially polygonal and a partially ellipsoidal cross-sectional profile. That is, the support member 110 may have cross section with arcuate portions and straight portions. In a particular instance, the cross-sectional profile of the support member 110 may be uniform around the circumference of the support member 110. In another particular instance, the cross-sectional profile of the support member 110 may not be constant around the circumference of the support member 110. For example, the support member 110 may have a first cross-sectional profile at a first circumferential location and a second cross-sectional profile at a second circumferential location, wherein the first and second cross-sectional profiles are different from one another. This may be advantageous in applications where particular or uneven pressures are expected.

The support member 110 may have an aspect ratio, as defined by a ratio of the width of the support member 110 in a radial direction relative of the seal 100 to the height of the support member 110 in an axial direction relative to the seal 100, or width/height. In an embodiment, the width/height of the support member 110 can be no greater than 1.0, such as no greater than 0.9, no greater than 0.8, no greater than 0.7, no greater than 0.6, no greater than 0.5, no greater than 0.4, no greater than 0.3, no greater than 0.25, no greater than 0.2, or even no greater than 0.15. In another embodiment, the width/height of the support member 110 can be no less than 0.001, such as no less than 0.01, or even no less than 0.1.

The support member 110 can be disposed within the spring 108 so as to be at least partially contained therein. In the relaxed state, the support member 110 may contact an inner surface 120 of the spring 108. As used herein, "relaxed state" refers to a condition where the seal 100 is not installed within an annulus. That is, the seal 100 is in a "relaxed state" when the seal 100 is uninstalled (e.g., prior to installation in an assembly or after being removed from an assembly). Contact between the support member 110 and the spring 108 may occur along only a portion of the surface area of the inner surface 120. That is, in an embodiment, the support member 110 may not contact the entire inner surface 120 when in the relaxed state. In a particular embodiment, the support member 110 may contact less than 50% of the inner surface 120, such as less than 40%, less than 30%, less than 20%, less than 10%, or even less than 5%. In another embodiment, the support member 110 may contact at least 0.5% of the inner surface 120, such as at least 1% of the inner surface. In such embodiments, the height of the support member 110 may be generally equal to or greater than the diameter of the inner surface 120 of the spring 108.

In a particular instance, the support member 110 may contact the spring 108 at two locations when viewed in cross section. The two locations may be at approximately diametrically opposite locations along the spring 108. As used herein, "approximately diametrically opposite locations" refers to an angular location of an object that is within a range of 75% and 105% with respect to a reference line. In another embodiment, the two locations may be at diametrically opposite locations along the spring 108 (i.e., 180° with respect to one another).

In the relaxed state, the support member 110 may provide a biasing force against the spring 108. Specifically, the support member 110 may contact the inner surface 120 and provide an outwardly biasing force thereagainst. In a particular embodiment, the biasing force against the spring 108 can be at least 0.001 N/mm$^2$, such as at least 0.01 N/mm$^2$. In another embodiment, the biasing force can be less than 10 N/mm$^2$, such as less than 5 N/mm$^2$, less than 4 N/mm$^2$, less than 3 N/mm$^2$, less than 2 N/mm$^2$, less than 1 N/mm$^2$, less than 0.5 N/mm$^2$, less than 0.25 N/mm$^2$, or even less than 0.1 N/mm$^2$.

In yet a further embodiment, the support member 110 may be disposed within and spaced apart from the inner surface 120 of the spring 108. By way of example, the height of the support member 110 may be less than 100% the diameter of the inner surface 120 of the spring 108, such as less than 99% the diameter, less than 98% the diameter, less than 97% the diameter, less than 96% the diameter, less than 95% the diameter, or even less than 90% the diameter. In another embodiment, the height of the support member 110 may be no less than 10% the diameter of the inner surface 120, such as no less than 25% the diameter, or even no less than 50% the diameter. In said embodiment, the support member 110 may provide a biasing force against the inner surface 120 of approximately 0 N/mm$^2$.

In accordance with a particular embodiment, when in the relaxed state, the support member 110 may float within the spring 108. That is, the support member 110 may be spaced apart from the inner surface 120 of the spring 108. In a very particular embodiment, one or more elements may connect the support member 110 to the spring 108.

In the relaxed state, the spring 108 may have a generally round cross section. That is, the spring 108 may be a helical spring, as described above. FIG. 2 illustrates the spring 108 and support member 110 in the relaxed state.

FIG. 3 illustrates the spring 108 and support member 110 during operation at certain pressures. As illustrated, the spring 108 may deflect at high pressures (or back pressures) so as to define a generally polygonal cross-sectional profile. By way of example, the spring 108 may deflect to have a generally rectangular cross section in the operational state. Upon an axial loading condition such that that exhibited in high pressure applications, the spring 108 may deform in an axial direction of the seal 100 so as to contact or even push against the support member 110. The opposite end of the spring 108 (the portion of the spring closest to the back surface 118) may simultaneously be biased by the heel 116. Meanwhile, the lips 112 and 114, compressed between the shaft and body of the valve (discussed in greater detail below), may bias the spring 108 in a direction transverse to the axial height of the seal 100, thus generating generally four biasing force directions, two opposing axial forces 126 and 128 (by the system pressure and the heel 116 or insert 122) and two opposing radial forces 130 and 132 (by the lips 112 and 114). It is noted that the biasing forces described may be indirectly loaded against the spring in particular applications. That is, the biasing forces may be introduced to the spring 108 through one or more intermediate components or layers. For example, as discussed below in greater detail, the system pressure represented by line 126 may be applied to the spring 108 indirectly through a secondary ring 124 (FIG. 5) disposed adjacent to the seal 100.

In an embodiment, the spring 108 can have a first spring rate, $K_1$, and the support member 110 can have a second spring rate, $K_2$, different from the first spring rate. In a particular embodiment, the first spring rate can be less than the second spring rate. For example, $K_1$ can be less than 0.99 $K_2$, such as less than 0.95 $K_2$, less than 0.9 $K_2$, less than 0.85 $K_2$, less than 0.8 $K_2$, less than 0.75 $K_2$, less than 0.7 $K_2$, less than 0.65 $K_2$, Less than 0.6 $K_2$, less than 0.55 $K_2$, less than 0.5 $K_2$, less than 0.45 $K_2$, less than 0.4 $K_2$, less than 0.35 $K_2$, less than 0.3 $K_2$, less than 0.25 $K_2$, less than 0.2 $K_2$, less than 0.15 $K_2$, less than 0.1 $K_1$, or even less than 0.05 $K_2$. In an embodiment, $K_1$ can be at least 0.01 $K_2$. In a particular instance, a higher spring rate for the support member 110 can permit use of a more flexible or softer spring 108 while preventing collapse thereof at high operational pressures.

In an embodiment, the spring 108 may have an unloaded inner diameter, $D_U$, as measured in the relaxed state (FIG. 2), and a minimum loaded inner dimension, $D_L$, as measured in the operational state (FIG. 3), that are different from one another. In a particular embodiment, $D_U/D_L$ can be at least 1.01, such as at least 1.05, at least 1.1, at least 1.15, at least 1.2, or even at least 1.25. In another particular embodiment, $D_U/D_L$ can be no greater than 10.0, such as no greater than 5.0, no greater than 4.0, no greater than 3.0, no greater than 2.0, no greater than 1.75, no greater than 1.5, or even no greater than 1.3. As $D_U/D_L$ defines a ratio of spring deflection, $D_U/D_L$ may be adjusted with adjustment, shape, or material selection of the support member 110 or even shape, design, or material selection of the spring 108.

In a non-illustrated embodiment, the spring may include a first spring and a second spring. The first spring may be disposed radially within the second spring. Moreover, the first spring may contact the second spring at least partially along the inner surface of the second spring. That is, the first and second springs may be concentric and in contact with one another, effectively forming a spring having two-ply wall thickness. In a more particular embodiment, the first and second springs may be devoid of a support member as described above. That is, the first spring may act in a manner similar to the support member by providing an outwardly biasing force against the second spring. In an embodiment, the first and second springs are both helical springs. The cross section of the coils of the first spring may differ from the cross section of the coils of the second spring in shape, size, material, or physical characteristics. That is, the springs may be different from one another. A lubricant or sliding material may be disposed at least partially between a surface of the first spring and a surface of the second spring and can reduce frictional resistance therebetween. The first or second springs can comprise any of the features described above with respect to the spring 108. For example, the first or second springs can at least partially include, or even consist essentially of, for example, Elgiloy, Inconel, Hastelloy, a steel, or a combination thereof.

Figure 5:
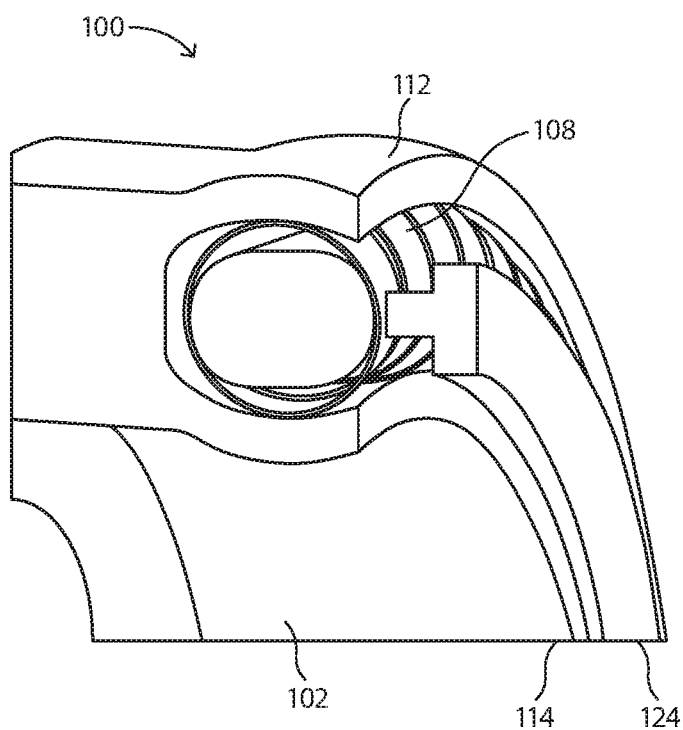
FIG. 5 includes a cross-sectional perspective view of the seal in accordance with an embodiment.

Referring to FIG. 5, in certain embodiments, the seal 100 may be disposed adjacent with a secondary ring 124 adapted to contact the spring 108. The secondary ring 124 may be coaxial with the seal 100 and may provide a biasing force against the spring 108 in the axial direction of the seal 100. For example, the secondary ring 124 may provide a biasing force against the spring 108 of at least 0.1 N/mm$^2$, such as at least 0.5 N/mm$^2$, at least 1 N/mm$^2$, or even at least 5

N/mm². In another embodiment, the secondary ring 124 may provide a biasing force against the spring 108 of no greater than 100 N/mm², such as no greater than 50 N/mm², or even no greater than 10 N/mm². In yet a further embodiment, the secondary ring 124 may not provide a biasing force against the spring 108. In a particular embodiment, the secondary ring 124 may only contact the spring 108 while remaining spaced apart and not in contact with the jacket 102 of the seal 100.

As illustrated, the secondary ring 124 may have a generally polygonal cross section. In a more particular embodiment, the secondary ring 124 may have a generally T-shaped cross-sectional profile. In another embodiment, the secondary ring 124 may have an ellipsoidal cross section. For example, in a non-illustrated embodiment, the secondary ring 124 may have an ovular or circular cross-sectional profile. In yet a further embodiment, the cross section of the secondary ring 124 may be partially ellipsoidal and partially polygonal. That is, the cross section of the secondary ring 124 may have linear portions and arcuate portions.

The secondary ring 124 may provide a biasing force against the spring 108 when operational pressure is minimal (i.e., prior to the spring 108 fully deforming to bias the lips 112 and 114 apart. This may prevent the seal 100 from leaking at low operating pressure conditions or during rapid transitions from low pressure to high pressure conditions.

The secondary ring 124 may at least partially include, or even consist essentially of, a polymer, a metal, or a combination thereof. In a particular aspect, the secondary ring 124 may include a material similar to, or the same as, the jacket 102. In another aspect, the secondary ring 124 may include a material different from the material of the jacket 102.

Figure 6:
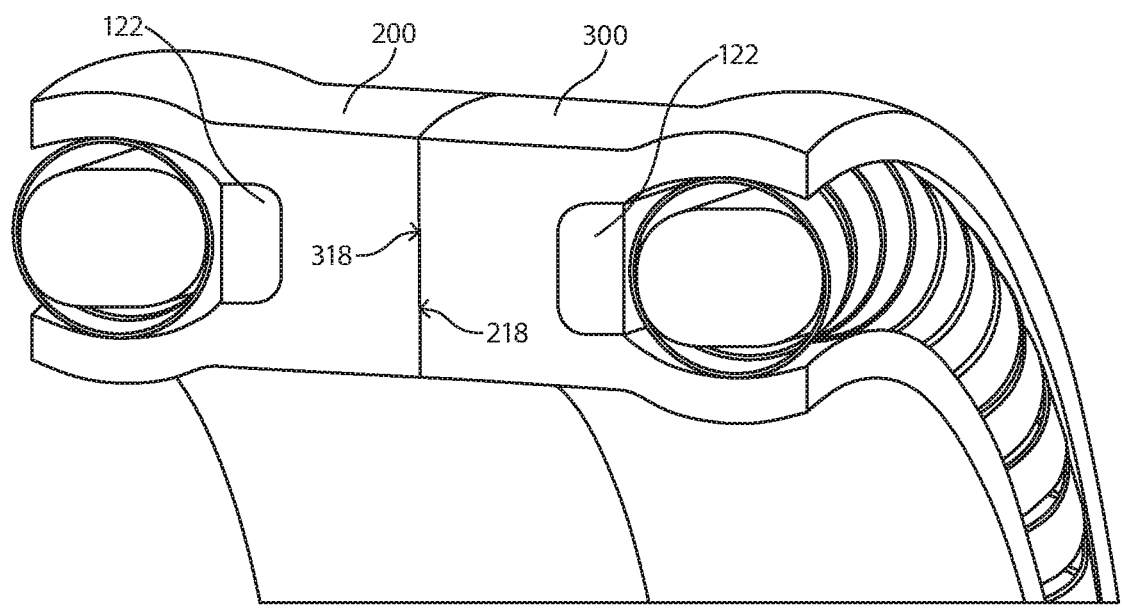
FIG. 6 includes a cross-sectional perspective view of a seal assembly in accordance with an embodiment.
Figure 7:
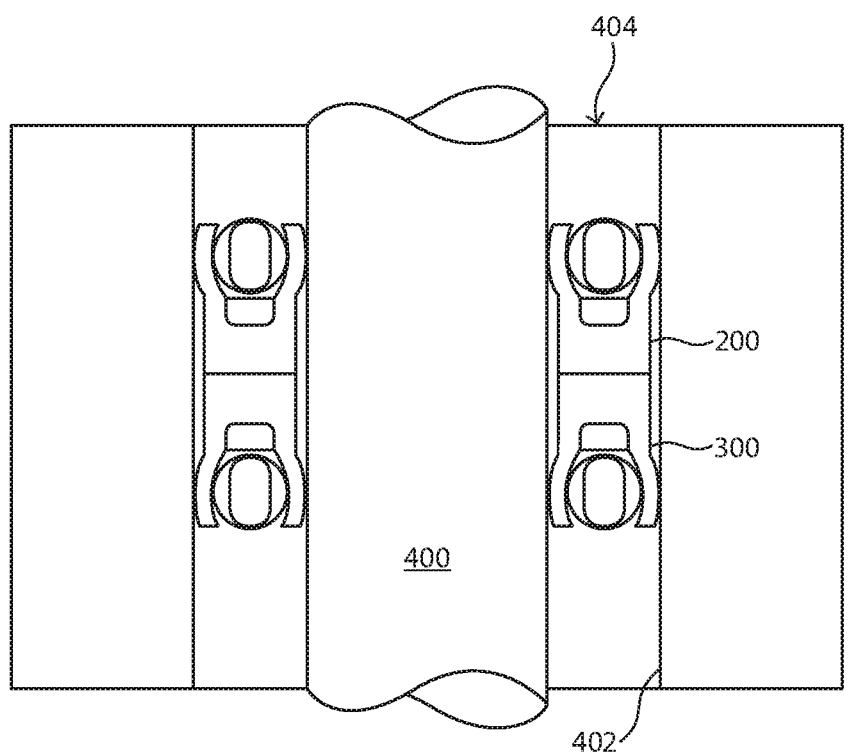
FIG. 7 includes a cross-sectional elevation view of the seal assembly for bidirectional use disposed in a valve in accordance with an embodiment.

Referring to FIGS. 6 and 7, in operation, two seals 200 and 300 may be utilized to effectively seal an annulus 404 formed between a shaft 400 and a bore 402 rotatable or reciprocal with respect to one another. The seals 200 and 300 may each have any similar characteristics as the seal 100 described above.

The seals 200 and 300 may be similar or different as compared to one another. For example, while seal 200 may be formed of a relatively rigid material and have a spring with a high spring rate, seal 300 may be formed of a relatively softer material and have a low spring rate. Alternatively, one of the seals 200 or 300 may include an insert 122 described above while the other of the seals 200 or 300 may be devoid of said insert 122.

At least one of the seals 200 and 300 can include a planar back surface 218 or 318, respectively. In a particular embodiment, both seals 200 and 300 can include planar back surfaces 218 and 318, respectively. The seals 200 and 300 can be oriented opposite one another such that the back surfaces 218 and 318 are adjacent. More particularly, the seal 200 may be disposed in a first axial direction while the seal 300 is disposed in a second axial direction opposite the first axial direction. The back surfaces 218 and 318 of the seals 200 and 300, respectively, may at least partially contact one another. A buffer or intermediate element (not illustrated) may be disposed at least partially between the back surfaces 218 and 318.

The seals 200 and 300 form an assembly which can be utilized in a bidirectional pressure application. The seal 200 may be oriented and protect against leakage of fluid in a forward direction, while the seal 300 may be oriented and protect against leakage of fluid in a backward direction. In this regard, the seals 200 and 300 may be selected to have specific characteristics which permit effective sealing in those particular orientations. Particular suitable applications include cryogenic valves, pistons, and other movable components requiring sealing therebetween.

Unlike with traditional seals for use in cryogenic applications, the present assembly has a radial tolerance of at least 0.1 mm, such as at least 0.2 mm, at least 0.3 mm, at least 0.4 mm, at least 0.5 mm, at least 1 mm, at least 2 mm, at least 3 mm, at least 4 mm, or even at least 5 mm. As used herein, "radial tolerance" refers to the seal assembly's ability to absorb manufacturing and installation tolerances between shaft and bore (or inner and outer components). Traditional seal assemblies are unable to absorb tolerances as they require precise machining and manufacturing tolerances (specifically in the axial direction relative to the seal) and thus are not adapted to readily deform and accommodate unanticipated manufacturing and installation tolerances.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Embodiment 1

A seal comprising:
an annular jacket comprising a body defining an annular recess;
a helical spring disposed within the annular recess; and
a support member disposed within the helical spring to provide a biasing force against the helical spring in the operational state.

Embodiment 2

A seal assembly comprising:
a first seal comprising:
an annular jacket comprising a body defining an annular recess;
a helical spring disposed within the annular recess;
a support member disposed within an aperture of the helical spring; and
a second seal comprising:
an annular jacket comprising a body defining an annular recess;
a helical spring disposed within the annular recess;
a support member disposed within an aperture of the helical spring,
wherein the first and second seals contact each other.

Embodiment 3

A seal assembly comprising a first seal abutting a second seal, the first and second seals each comprising a helical spring having a support member disposed in an aperture of the helical spring and contacting the helical spring at approximately diametrically opposite locations.

Embodiment 4

A valve assembly comprising:
a valve comprising a body;
a shaft disposed within the body and rotatable with respect thereto; and
a seal assembly disposed between the body and the shaft, the seal assembly comprising:
a first seal comprising:

an annular jacket comprising a body defining an annular recess;
a helical spring disposed within the annular recess;
a support member disposed within an aperture of the helical spring; and
a second seal comprising:
an annular jacket comprising a body defining an annular recess;
a helical spring disposed within the annular recess;
a support member disposed within an aperture of the helical spring,
wherein the first and second seals contact each other.

Embodiment 5

The seal, seal assembly, or valve assembly according to any one of the preceding embodiments, wherein the seal is adapted to provide an effective sealing characteristic at temperatures below −25° C.

Embodiment 6

The seal, seal assembly, or valve assembly according to any one of the preceding embodiments, wherein the annular jacket of at least one of the first and second seals further comprises an insert disposed adjacent to the annular recess.

Embodiment 7

The seal, seal assembly, or valve assembly according to embodiment 6, wherein the body of the annular jacket comprises a first material, wherein the insert comprises a second material, and wherein the first material is different than the second material.

Embodiment 8

The seal, seal assembly, or valve assembly according to embodiment 7, wherein the first material comprises a relatively softer material as compared to the second material.

Embodiment 9

The seal, seal assembly, or valve assembly according to any one of embodiments 7 and 8, wherein the first material comprises a UHMWPE, a fluoropolymer such as PTFE, or a blend comprising a fluoropolymer, and wherein the second material comprises a material or blend of materials harder than PTFE, such as a PEEK.

Embodiment 10

The seal, seal assembly, or valve assembly according to any one of embodiments 6-9, wherein the insert is disposed along an axial end of the annular recess.

Embodiment 11

The seal, seal assembly, or valve assembly according to any one of the preceding embodiments, wherein the helical spring of at least one of the first and second seals comprises a plurality of coils, such as at least 2 coils, at least 3 coils, at least 4 coils, at least 5 coils, at least 10 coils, at least 100 coils, or even at least 1000 coils.

Embodiment 12

The seal, seal assembly, or valve assembly according to embodiment 11, wherein at least two adjacent coils of the helical spring at least partially overlap one another.

Embodiment 13

The seal, seal assembly, or valve assembly according to any one of the preceding embodiments, wherein the helical spring comprises a metal, such a steel, such as spring steel.

Embodiment 14

The seal, seal assembly, or valve assembly according to any one of the preceding embodiments, wherein, in a relaxed state, the support member contacts the helical spring at approximately diametrically opposite locations.

Embodiment 15

The seal, seal assembly, or valve assembly according to any one of the preceding embodiments, wherein, in an operational state, the support member nearly or partially contacts the helical spring at approximately diametrically opposite locations.

Embodiment 16

The seal, seal assembly, or valve assembly according to any one of embodiments 1, 3, 14, and 15, wherein, in a relaxed state, the support member provides a biasing force against the helical spring of less than 10 N/mm$^2$, such as less than 5 N/mm$^2$, less than 4 N/mm$^2$, less than 3 N/mm$^2$, less than 2 N/mm$^2$, less than 1 N/mm$^2$, less than 0.5 N/mm$^2$, less than 0.25 N/mm$^2$, or even less than 0.1 N/mm$^2$.

Embodiment 17

The seal, seal assembly, or valve assembly according to any one of embodiments 1, 3, 14, 15, and 16, wherein, in a relaxed state, the support member provides a biasing force against the helical spring of approximately 0 N/mm$^2$.

Embodiment 18

The seal, seal assembly, or valve assembly according to any one of the preceding embodiments, wherein the helical spring of at least one of the first and second seals has a generally round cross section in the relaxed state.

Embodiment 19

The seal, seal assembly, or valve assembly according to any one of the preceding embodiments, wherein the helical spring of at least one of the first and second seals has a generally polygonal cross section in the operational state.

Embodiment 20

The seal, seal assembly, or valve assembly according to any one of the preceding embodiments, wherein the helical spring of at least one of the first and second seals has a generally rectangular cross section in the operational state.

Embodiment 21

The seal, seal assembly, or valve assembly according to any one of the preceding embodiments, wherein the support member comprises a metal, such as a steel or a polymer, such as a PEEK.

Embodiment 22

The seal, seal assembly, or valve assembly according to any one of the preceding embodiments, wherein the support member comprises a uniform cross section as measured around the seal.

Embodiment 23

The seal, seal assembly, or valve assembly according to any one of the preceding embodiments, wherein the support member is adapted to prevent collapse of the helical spring under high loading or back loading conditions.

Embodiment 24

The seal, seal assembly, or valve assembly according to any one of the preceding embodiments, wherein the support member has a width, measured in a radial direction of the seal, and a height, as measured in an axial direction of the seal, and wherein the helical spring has an inner diameter that is greater than the width of the support member.

Embodiment 25

The seal, seal assembly, or valve assembly according to embodiment 24, wherein the width of the support member is no greater than 150% of the inner diameter of the helical spring, such as no greater than 100% of the inner diameter of the helical spring, no greater than 99% of the inner diameter of the helical spring, no greater than 98% of the inner diameter of the helical spring, no greater than 97% of the inner diameter of the helical spring, no greater than 96% of the inner diameter of the helical spring, no greater than 95% of the inner diameter of the helical spring, no greater than 90% of the inner diameter of the helical spring, no greater than 85% of the inner diameter of the helical spring, or even no greater than 50% of the inner diameter of the helical spring.

Embodiment 26

The seal, seal assembly, or valve assembly according to any one of embodiments 24 and 25, wherein the width of the support member is at least 1% of the inner diameter of the helical spring, such as at least 5% of the inner diameter of the helical spring, or even at least 10% of the inner diameter of the helical spring.

Embodiment 27

The seal, seal assembly, or valve assembly according to any one of embodiments 24-26, wherein the width of the support member is uniform along the axial length of the support member.

Embodiment 28

The seal, seal assembly, or valve assembly according to any one of embodiments 24-26, wherein the width of the support member is not constant along the axial length of the support member.

Embodiment 29

The seal, seal assembly, or valve assembly according to any one of embodiments 24-28, wherein a ratio of width/height of the support member is no less than 0.001, such as no less than 0.01, or even no less than 0.1.

Embodiment 30

The seal, seal assembly, or valve assembly according to any one of embodiments 24-29, wherein a ratio of width/height of the support member is no greater than 1.0, such as no greater than 0.5, no greater than 0.25, or even no greater than 0.15.

Embodiment 31

The seal, seal assembly, or valve assembly according to any one of the preceding embodiments, wherein the helical spring has an unloaded inner diameter, $D_U$, as measured in a relaxed state, and a minimum loaded inner dimension, $D_L$, as measured in the operational state, and wherein $D_U/D_L$ is at least 1.01, such as at least 1.05, at least 1.1, at least 1.15, at least 1.2, or even at least 1.25.

Embodiment 32

The seal, seal assembly, or valve assembly according to any one of the preceding embodiments, wherein the helical spring has an unloaded inner diameter, $D_U$, as measured in a relaxed state, and a minimum loaded inner dimension, $D_L$, as measured in the operational state, and wherein $D_U/D_L$ is no greater than 2.0, such as no greater than 1.75, no greater than 1.5, or even no greater than 1.3.

Embodiment 33

The seal, seal assembly, or valve assembly according to any one of the preceding embodiments, wherein the support member contacts opposite axial ends of the helical spring.

Embodiment 34

The seal, seal assembly, or valve assembly according to any one of the preceding embodiments, wherein the helical spring comprises a first helical spring disposed radially within a second helical spring, and wherein the first and second helical springs contact each other.

Embodiment 35

The seal, seal assembly, or valve assembly according to any one of the preceding embodiments, wherein the helical spring comprises a two-ply thickness.

Embodiment 36

The seal, seal assembly, or valve assembly according to any one of the preceding embodiments, wherein the helical spring of at least one of the first and second seals comprises Elgiloy, Inconel, Hastelloy, a steel, or a combination thereof.

Embodiment 37

The seal, seal assembly, or valve assembly according to any one of the preceding embodiments, wherein the helical spring comprises a material comprising: cobalt, chromium, nickel, iron, molybdenum, manganese, or a combination thereof.

Embodiment 38

The seal, seal assembly, or valve assembly according to any one of the preceding embodiments, wherein the helical spring comprises a material comprising at least 30 wt % of cobalt, such as at least 35 wt % of cobalt, or even at least 40 wt % of cobalt.

Embodiment 39

The seal, seal assembly, or valve assembly according to any one of the preceding embodiments, wherein the helical spring has a yield strength of less than 1100 MPa, such as less than 1000 MPa, or even less than 900 MPa.

Embodiment 40

The seal, seal assembly, or valve assembly according to any one of the preceding embodiments, wherein the helical spring is heat treated.

Embodiment 41

The seal, seal assembly, or valve assembly according to any one of the preceding embodiments, wherein the support ring of at least one of the first and second seals extends through the entire circumference of the seal.

Embodiment 42

The seal, seal assembly, or valve assembly according to any one of the preceding embodiments, wherein the jacket of at least one of the first and second seals comprises:
a heel;
a first lip extending from the heel; and
a second lip extending from the heel,
wherein the first and second lips extend from the heel in a generally same direction, and wherein the annular recess is disposed between the first and second lips.

Embodiment 43

The seal, seal assembly, or valve assembly according to embodiment 42, wherein the heel of the first and second seals each comprises an axial end opposite the first and second lips, and wherein the axial ends of the first and second seals are adapted to contact one another.

Embodiment 44

The seal, seal assembly, or valve assembly according to embodiment 43, wherein the axial end of the first and seals are planar, and wherein approximately all of the axial end of the first seal is adapted to contact approximately all of the axial end of the second seal.

Embodiment 45

The seal, seal assembly, or valve assembly according to any one of embodiments 43 and 44, wherein the axial end of the first and second seals are planar, and wherein the entire axial end of the first seal is adapted to contact the entire axial end of the second seal.

Embodiment 46

The seal, seal assembly, or valve assembly according to any one of embodiments 42-45, wherein the jacket comprises a polymer, such as a fluoropolymer, such as a PTFE or a UHMWPE.

Embodiment 47

The seal, seal assembly, or valve assembly according to any one of embodiments 42-46, wherein at least one of the first and second seals further comprises a radial budge extending from at least one of the first and second lips.

Embodiment 48

The seal, seal assembly, or valve assembly according to any one of embodiments 42-47, wherein at least one of the first and second lips of at least one of the first and second seals comprises a skived lip.

Embodiment 49

The seal, seal assembly, or valve assembly according to any one of the preceding embodiments, further comprising a secondary ring adapted to be coaxial with at least one of the first and second seals.

Embodiment 50

The seal, seal assembly, or valve assembly according to embodiment 49, wherein the secondary ring contacts the helical spring of at least one of the first and second seals.

Embodiment 51

The seal, seal assembly, or valve assembly according to any one of embodiments 49 and 50, wherein the secondary ring does not contact the jacket of at least one of the first and second seals.

Embodiment 52

The seal, seal assembly, or valve assembly according to any one of embodiments 49-51, wherein the secondary ring is adapted to provide a biasing force against the helical spring of at least one of the first and second seals.

Embodiment 53

The seal, seal assembly, or valve assembly according to any one of embodiments 49-52, wherein the secondary ring is adapted to provide a biasing force against the helical spring of at least one of the first and second seals, and wherein the biasing force is at least 0.1 N/mm$^2$, such as at least 0.5 N/mm$^2$, at least 1 N/mm$^2$, or even at least 5 N/mm$^2$.

Embodiment 54

The seal, seal assembly, or valve assembly according to any one of the preceding embodiments, wherein the first and second seals define a seal assembly adapted to be disposed between a valve defining a body and a shaft disposed within the body and rotatable with respect thereto.

Embodiment 55

The seal, seal assembly, or valve assembly according to embodiment 54, wherein the first and second seals define a seal assembly, and wherein the seal assembly has a radial tolerance of at least 0.1 mm, such as at least 0.2 mm, at least 0.3 mm, at least 0.4 mm, at least 0.5 mm, at least 1 mm, at least 2 mm, at least 3 mm, at least 4 mm, or even at least 5 mm.

Embodiment 56

The seal, seal assembly, or valve assembly according to any one of embodiments 54 and 55, wherein the first seal is oriented in a first axial direction, wherein the second seal is oriented in a second direction opposite the first direction.

Embodiment 57

The seal, seal assembly, or valve assembly according to any one of embodiments 54-56, wherein the seal assembly is disposed axially within a cavity defined by a first hardware and a second hardware.

Embodiment 58

The seal, seal assembly, or valve assembly according to embodiment 57, wherein at least one of the first and second hardware provides an axially biasing load against the seal assembly.

Embodiment 59

The seal, seal assembly, or valve assembly according to any one of embodiments 57 and 58, wherein the first hardware provides an axially biasing load against the first seal, and wherein the second hardware provides an axially biasing load against the second seal.

Embodiment 60

The seal, seal assembly, or valve assembly according to any one of embodiments 57-59, wherein at least one of the first or second hardware provide an indirect axially biasing load against the seal assembly.

Embodiment 61

The seal, seal assembly, or valve assembly according to any one of embodiments 4 and 54 to 60, wherein the shaft is longitudinally translatable with respect to the body of the valve.

Embodiment 62

The seal, seal assembly, or valve assembly according to any one of the preceding embodiments, wherein the support member is adapted to contact the helical spring at a pressure of no greater than 9500 PSI, such as no greater than 5000 PSI, no greater than 1000 PSI, no greater than 900 PSI, no greater than 800 PSI, no greater than 700 PSI, no greater than 600 PSI, no greater than 500 PSI, or even no greater than 400 PSI.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

The invention claimed is:
1. A seal comprising:
an annular jacket comprising a body defining an annular recess, wherein the jacket comprises: a heel, a first lip extending from the heel, and a second lip extending from the heel;
a helical spring disposed within the annular recess and contacting both the first lip and the second lip; and
a support member disposed entirely interior to the helical spring and capable of contacting an inner surface of the spring to provide a biasing force against the helical spring in the operational state, wherein the seal comprises a planar back surface adapted to at least partially contact an adjacent back surface of a neighboring seal, wherein at least one of the lips bows outward after installation of the spring, and wherein at least one of the lips is arcuate when viewed in cross-section along its entire length, wherein, in a relaxed state, the support member contacts the helical spring at approximately diametrically opposite locations, wherein the support member includes a generally straight sidewall segment, wherein the helical spring has a generally round cross section in the relaxed state and a generally polygonal cross section in the operational state.
2. The seal of claim 1, wherein the annular jacket further comprises an insert disposed adjacent to the annular recess.
3. The seal of claim 2, wherein the body of the annular jacket comprises a first material, wherein the insert com- prises a second material, and wherein the first material is different than the second material.

4. The seal of claim 1, wherein, in a relaxed state, the support member provides a biasing force against the helical spring of less than 10 N/mm2.

5. The seal of claim 1, wherein the support member comprises a spring disposed radially within the helical spring, and wherein the spring contacts the helical spring.

6. The seal of claim 1, wherein the first and second lips extend from the heel in a generally same direction, and wherein the annular recess is disposed between the first and second lips.

7. The seal of claim 1, wherein the support member has a width, as measured in a radial direction of the seal, and a height, as measured in an axial direction of the seal, and wherein the helical spring has an inner diameter that is greater than the width of the support member.

8. The seal of claim 1, wherein the seal is adapted to provide an effective sealing characteristic at temperatures below −25° C.

9. The seal of claim 1, wherein the support member comprises a metal or a polymer.

10. The seal of claim 3, wherein the first material comprises a relatively softer material as compared to the second material.

11. The seal of claim 10, wherein the first material comprises a UHMWPE, a fluoropolymer such as PTFE, or a blend comprising a fluoropolymer, and wherein the second material comprises a material or blend of materials harder than PTFE, such as a PEEK.

12. The seal of claim 2, wherein the insert is disposed along an axial end of the annular recess.

13. The seal of claim 1, wherein the helical spring comprises a plurality of coils.

14. The seal of claim 1, wherein at least two adjacent coils of the helical spring at least partially overlap one another.

15. The seal of claim 1, wherein the support member comprises a uniform cross section as measured around the seal.

16. The seal of claim 1, wherein the support member of the seal has a width, measured in a radial direction of the seal, and a height, as measured in an axial direction of the seal, and wherein the helical spring has an inner diameter that is no less than the width of the support member, as measured in the relaxed state.

17. The seal of claim 1, wherein, in a relaxed state, the support member provides a biasing force against the helical spring of less than 10 N/mm2.

18. The seal of claim 1, wherein the support member extends around the entire circumference of the seals.

* * * * *